(12) United States Patent
Jiang et al.

(10) Patent No.: US 11,321,010 B1
(45) Date of Patent: May 3, 2022

(54) METHOD AND APPARATUS FOR DETERMINING AND DEPICTING EFFECTIVE STORAGE CAPACITY OF A STORAGE SYSTEM

(71) Applicant: EMC IP HOLDING COMPANY LLC, Hopkinton, MA (US)

(72) Inventors: Jiaorui Jiang, Somerville, MA (US); Jeremy O'Hare, Westborough, MA (US)

(73) Assignee: Dell Products, L.P., Hopkinton, MA (US)

(*) Notice: Subject to any disclaimer, the term of this patent is extended or adjusted under 35 U.S.C. 154(b) by 0 days.

(21) Appl. No.: 17/146,889

(22) Filed: Jan. 12, 2021

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/0683* (2013.01)

(58) Field of Classification Search
None
See application file for complete search history.

(56) References Cited

U.S. PATENT DOCUMENTS 10,732,884 B1 * 8/2020 Gupta .................. G06F 3/0604
2017/0153843 A1 * 6/2017 Dewitt .................. G06F 3/0604

* cited by examiner

*Primary Examiner* — Midys Rojas
(74) *Attorney, Agent, or Firm* — Anderson Gorecki LLP

(57) ABSTRACT

A method of determining and depicting an effective storage capacity of a storage system includes determining a storage-based limit of effective storage capacity and a metadata-based limit of effective storage capacity. The storage-based limit is based on an amount of unused capacity of a set of managed drives and a data reduction ratio achieved when host data is reduced prior to storage on the set of managed drives. Data reduction may include compression, deduplication, and pattern detection operations. The metadata-based limit is based on a volume of metadata that has been generated by the data, and the data reduction operations, in connection with writing the data to the set of managed drives, and based on an amount of memory allocated to storing the metadata. The effective storage capacity, actual storage usage, and data reduction ratio are graphically depicted over time to enable changes to these parameters to be visualized.

18 Claims, 7 Drawing Sheets

FIG. 7
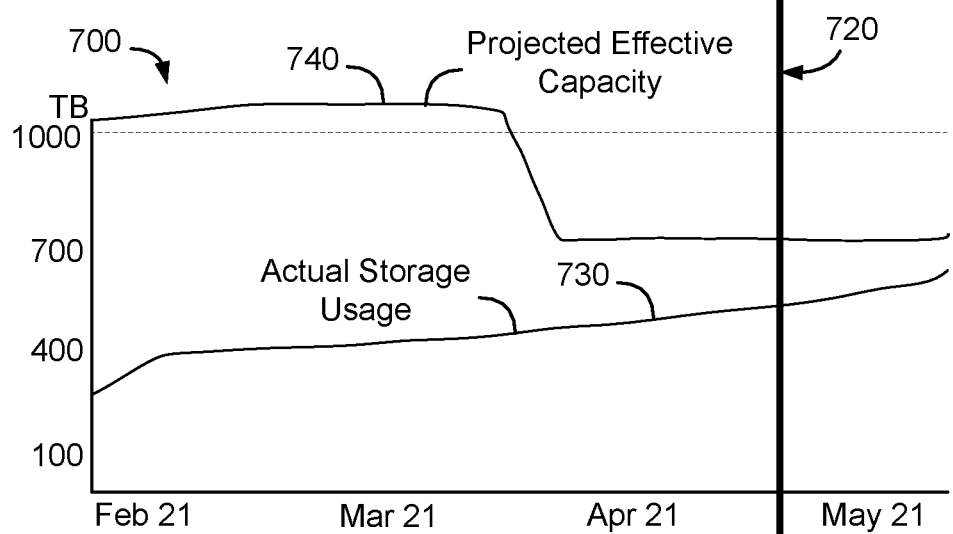
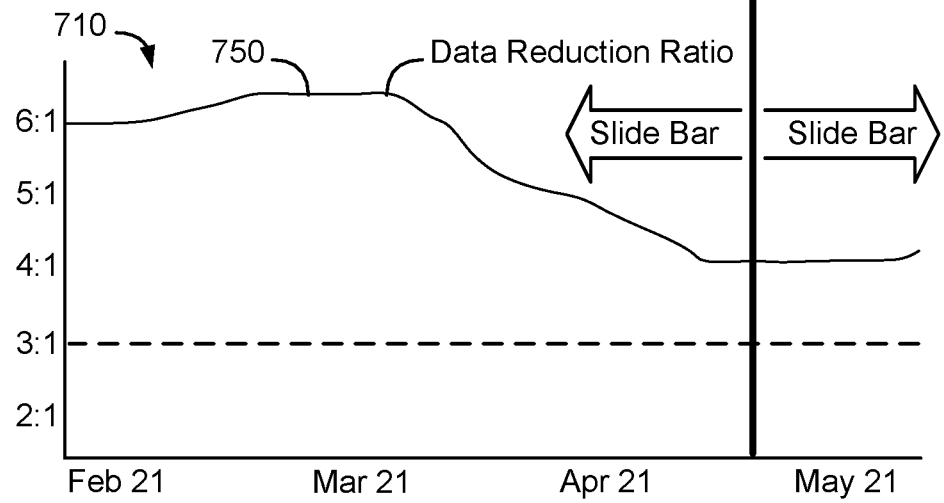

METHOD AND APPARATUS FOR DETERMINING AND DEPICTING EFFECTIVE STORAGE CAPACITY OF A STORAGE SYSTEM

FIELD

This disclosure relates to computing systems and related devices and methods, and, more particularly, to a method and apparatus for determining and depicting effective storage capacity of a storage system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A method of determining and depicting an effective storage capacity of a storage system includes determining a storage-based limit of effective storage capacity and a metadata-based limit of effective storage capacity. The storage-based limit is based on an amount of unused capacity of a set of managed drives and a data reduction ratio achieved when host data is reduced prior to storage on the set of managed drives. Data reduction may include compression, deduplication, and pattern detection operations. The metadata-based limit is based on a volume of metadata that has been generated by the data, and the data reduction operations, in connection with writing the data to the set of managed drives, and based on an amount of memory allocated to storing the metadata. The effective storage capacity, actual storage usage, and data reduction ratio are graphically depicted over time to enable changes to these parameters to be visualized.

BRIEF DESCRIPTION OF THE DRAWINGS

FIG. 7 is a view of an example graphical user interface of a storage system management application containing an example pair of graphs visually depicting the projected effective capacity of a storage system over time, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
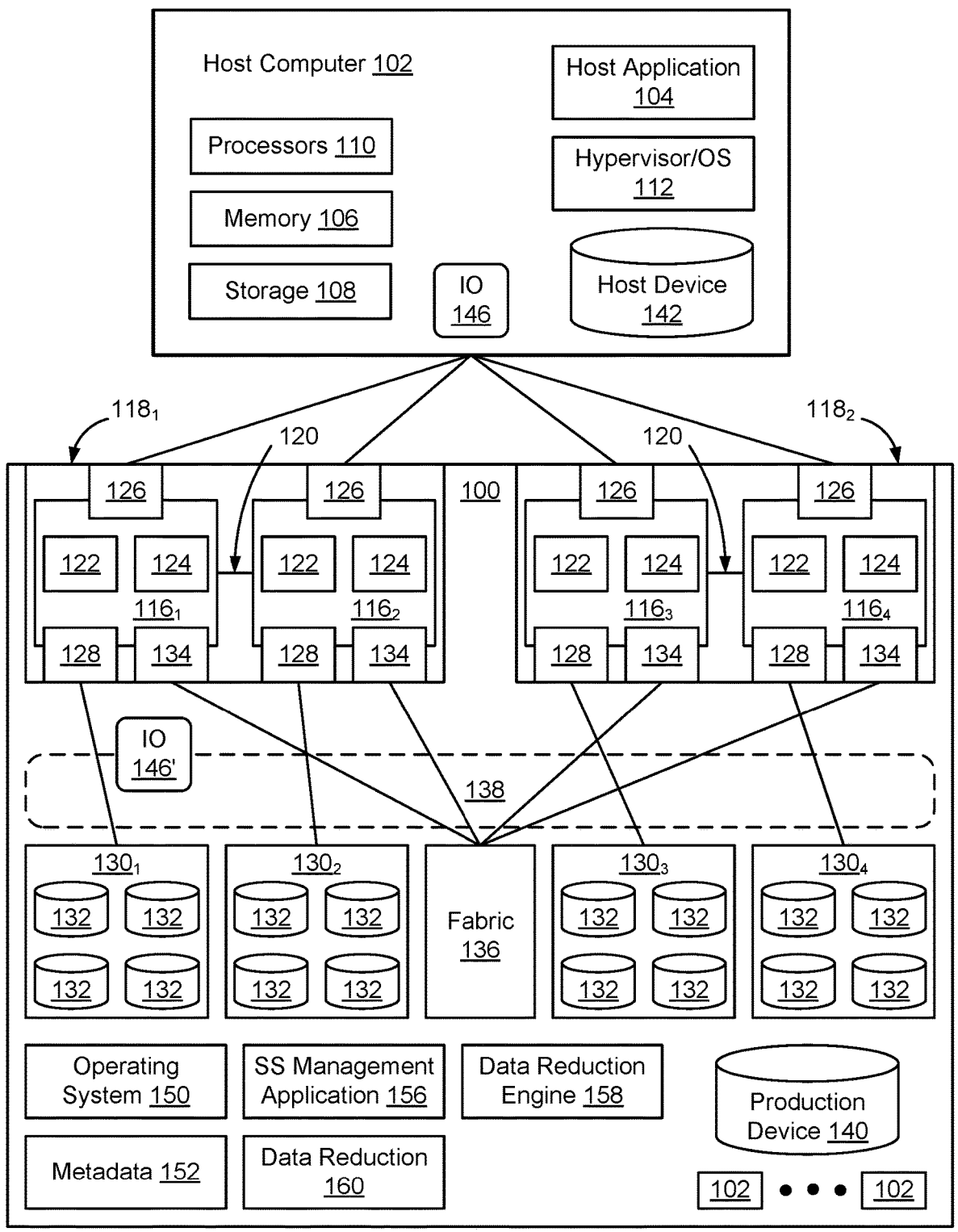
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata 152 that indicates, among various things, mappings between the production device 140 and the locations of extents of host application data in the virtual shared global memory 138 and the managed drives 132. Metadata 152 can also be generated in connection with other operations, such as in connection with data reduction, as described in greater detail below. In some embodiments, metadata 152 is stored by the storage system 100 in virtual shared global memory 138.

In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

A given storage system has finite storage resources in managed drives 132 that can be used to store data for these applications 104. If a storage system runs out of capacity, it is possible for data to be lost or unavailable, which is frustrating to the customers and can impact performance of the applications. In some instances, capacity issues can also impact business by, for example, causing an application to stop executing which may have financial impacts on the customer.

A person responsible for managing operation of the storage system 100 may monitor the amount of remaining available storage capacity of the managed drives 132. Unfortunately, current capacity projections are based on usable capacity, which is a static number based on the current amount of unused disk space. However, there are other factors that also influence the available storage capacity of a storage system 100, such as memory limitations and data reduction ratios, which conventionally were shown disparately throughout the storage system management application graphical user interface, with no apparent connection.

As shown in FIG. 1, in some embodiments the storage system 100 includes a data reduction system 160 configured to reduce the size of host data prior to storage of the host data on managed drives 132. The data reduction system 160 allows the hosts 102 to store more data (effective capacity, or TBe), than exists in raw disk space (TBu) on managed drives 132. Example data reduction operations may include deduplication, compression, and pattern detection operations. This enables the production device 140 to be smaller in size than the host device 142, which makes it appear to the host as if the managed drives 132 of storage system 100 have a larger effective capacity.

In some embodiments, a storage system management application 156 enables effective management of capacity by helping the end user monitor and manage disparate resources (Contributing Factors) that drive effective capacity of the storage system. The storage system management application 156 monitors dynamically changing data reduction efficiency, metadata usage, and usage of managed drives 132, to determine a projected effective capacity of the storage resources 130 of the storage system 100. The projected effective capacity is depicted graphically to visually represent the interconnectedness of actual storage resource 130 usage, data reduction ratio, and effective storage capacity to help the administrator better monitor and troubleshoot capacity problems.

Figure 5:
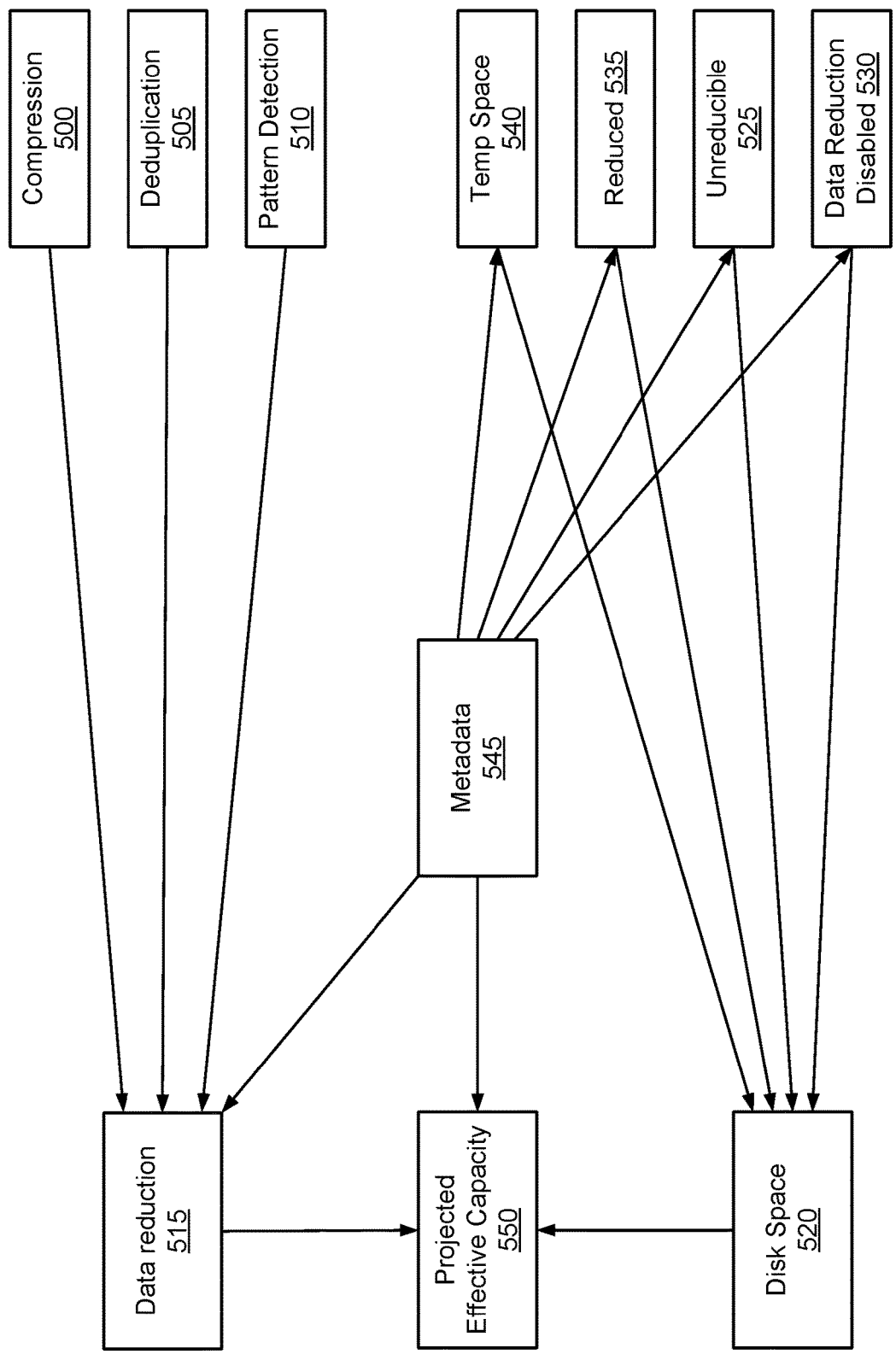
FIG. 5 is a functional block diagram showing a set of contributing factors that influence calculation of the projected effective capacity of a storage system, according to some embodiments.

In some embodiments, a method of projecting effective capacity takes into account several contributing factors that directly influence a storage system's effective capacity: usable disk space on managed drives 132, data reduction, and metadata usage. Each of these factors further influences or is influenced by additional factors as shown in FIG. 5. The storage system management application 156 uses each factor, determines current usage of the resources, and calculates an estimate of how much effective capacity can be written to the storage resources 130 of the storage system 100.

In some embodiments, the storage system management application 156 generates a graph showing the projected effective capacity and data reduction ratio over time (see FIG. 7). This visual depiction provides a view that shows the interconnectedness of the resources and shows the relationship between previous projected effective capacity and the historic data reduction ratio. The visual change in the shape of the projected effective capacity tells the customers whether they can write more or less data to the array compared to an earlier point in time, enabling them to investigate the cause of the change or to adjust their planning accordingly. When the shape change of projected effective capacity matches the slope change in data reduction, then it suggests the change in effective capacity is due to changes in data reduction.

Figure 2:
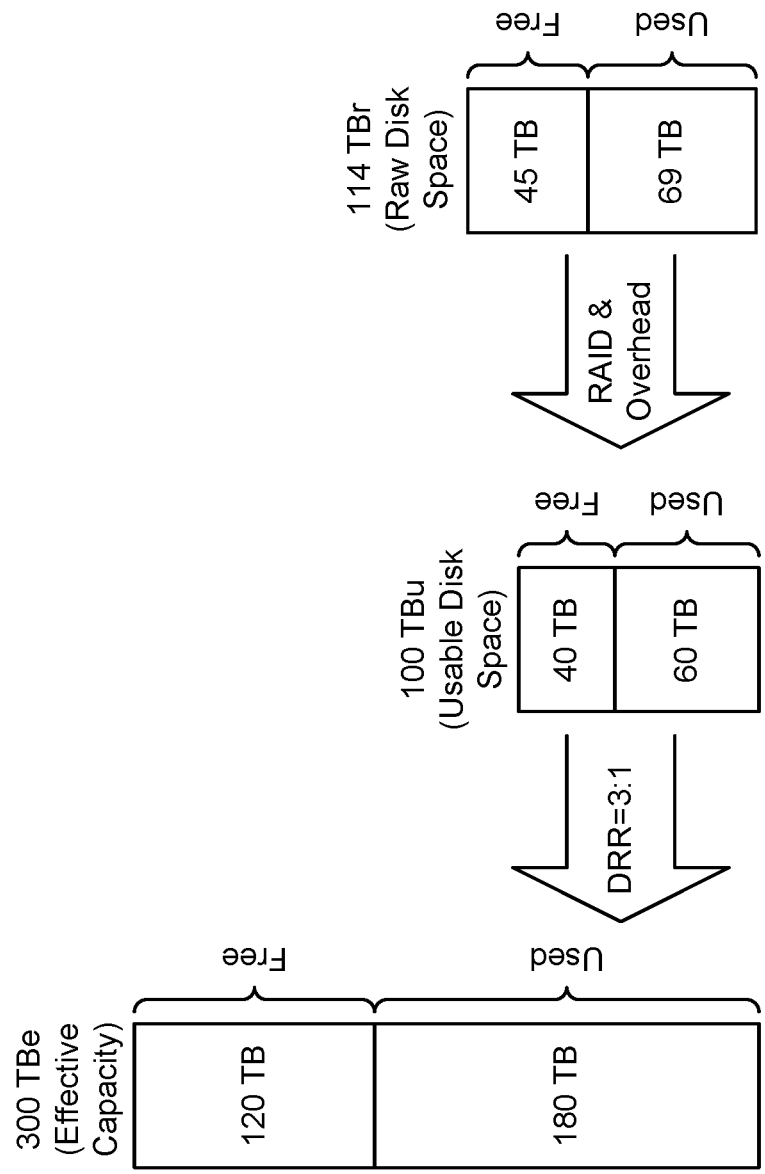
FIG. 2 is a functional block diagram showing the relationship between raw disk space (TBr), physical disk space that is usable for storage of application data (TBu), and effective disk space (TBe), according to some embodiments.

FIG. 2 is a functional block diagram showing the relationship between raw disk space (TBr) of managed drives 132, physical disk space of managed drives 132 that is usable for storage of application data (TBu), and effective disk space (TBe), according to some embodiments.

Raw disk space refers to the actual storage volume of the set of managed drives 132 of storage system 100. Different storage systems may have different numbers of managed drives 132 or managed drives 132 of different sizes, and accordingly different storage systems 100 may have different amounts of raw disk space (TBr). For purposes of illustration, FIG. 2 shows an example storage system as having 114 TB of raw disk space on managed drives 132.

Some of the raw disk space of managed drives 132 is consumed by data protection (e.g. RAID) and other system overhead. For example, a portion of the raw disk space of managed drives 132 may be reserved for use by the storage system operating system 150. Accordingly, the actual usable disk space (TBu) of the managed drives 132 that is physically available to be used to store host data is less than the amount of raw disk space of managed drives 132. In the illustrated example, the usable disk space (TBu) of managed drives 132 is shown as 100 TB.

The effective amount of data (TBe) that hosts 102 can write to host devices 142, that can be stored on the usable disk space (TBu) of managed drives 132, will depend on whether the host data is able to be reduced prior to storage. For example, data may be compressed to reduce the size of the data prior to storage on managed drives 132. Likewise, it is possible to perform deduplication (dedupe) to only store one copy of the host data rather than storing multiple copies of the same data. Likewise, the host data may include tracks that contain particular known patterns (such as all 0s or all 1s) that can be referenced using metadata instead of being stored on managed drives 132. Accordingly, the effective amount of storage (TBe) that is provided to hosts 102, which hosts 102 may use to write data to host devices 142, may be significantly larger than the amount of usable storage (TBu) of managed drives 132. For example, as shown in FIG. 2, if the Data Reduction Ratio (DRR) is 3:1, the effective capacity (TBe) of the managed drives 132 is 300 TB, even though the usable amount of actually usable disk space (TBu) on the managed drives 132 is only 100 TB.

Figure 3:
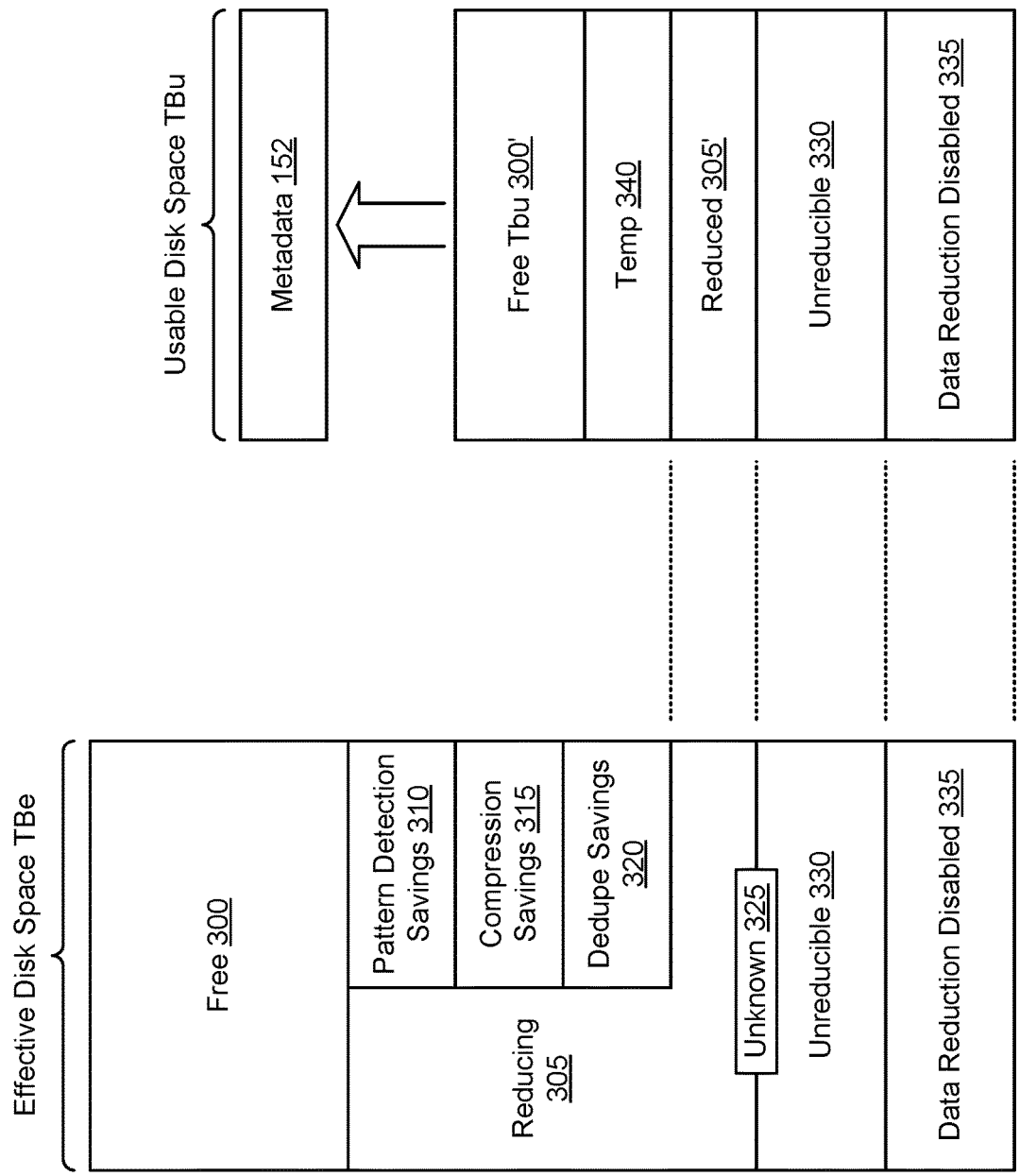
FIG. 3 is a functional block diagram showing the relationship between effective disk space (TBe) and usable disk space (TBu) in greater detail, according to some embodiments.

FIG. 3 is a functional block diagram showing the relationship between effective capacity (TBe) and usable disk space (TBu) in greater detail, according to some embodiments. As shown in FIG. 3, the effective disk space includes free space 300 that is not being used, and used space, which includes three types of data: data that is able to be reduced in size 305, data that is unreducible 330, and data that could be reduced in size but which the administrator has determined should not be reduced in size 335.

When data reduction is disabled on a given host device 142, data reduction techniques will not be used to reduce the size of that device such that the production device 140 will be the same size as the host device. Accordingly, as shown on the right-hand side of FIG. 3, the data reduction disabled portion of data 335 consumes the same amount of usable storage capacity (TBu) as it does effective storage capacity (TBe). Similarly, it is possible for some classes of data, such as encrypted data, to be unreducible 330. The unreducible portion of data 330, like the data reduction disabled data 335, consumes as much usable storage capacity (TBu) as it does effective storage capacity (TBe). If all host data is either unreducible 330 or data reduction disabled 335, the effective storage capacity (TBe) will approximate the usable storage capacity (TBu).

Often, a portion or most of the data stored on host devices 142 can be reduced in size prior to being stored on managed drives 132. This portion of host data is labeled "reducing" 305 in FIG. 3. To the host, it appears that the reducing portion 305 is stored on managed drives 132. However, the storage system 100 processes the host data prior to actually storing the data on the managed drives 132 using one or more data reduction techniques, such as pattern detection, compression, and deduplication. Other data reduction techniques may be used as well.

A first data reduction technique is referred to herein as "pattern detection." Certain patterns appear often in data sets. For example, a given track of data might have a known commonly occurring pattern, such as all 0s or all 1s, or a known pattern of 0s and 1s. Rather than writing the pattern to the managed drives 132, it is possible to eliminate the track and simply note in metadata that the track has the identified pattern. If the track is later requested, the metadata can be used to enable the pattern to be reproduced. Accordingly, pattern detection can be used to reduce the amount of data that is actually stored in the managed drives 132 of storage system 100.

Data can also be compressed 315, which can reduce the size of the data that is stored on managed drives 132. There are many compression algorithms, and the particular compression algorithm may be selected depending on the implementation.

Data provided by the host 102 may also have multiple copies of the same data. Rather than storing the multiple copies on managed drives 132, it is possible for the storage system to store a single copy of the data and use metadata to keep track of each of the multiple copies. The process of maintaining only a single copy of data on managed drives 132 is referred to herein as deduplication.

Accordingly, the portion of effective capacity (TBe) that is classified as reducing, will see some savings from pattern detection 310, compression 315, and deduplication 320, such that the amount of usable capacity 305' required to store the reducing data 305 is significantly lower than what the host considers to be stored on the storage system.

The data that is actually stored on the usable portion of physical storage resources (TBu) includes the data that is associated with data reduction disabled 335, unreducible data 330, and the reduced data 305'. The rest of the usable storage capacity (TBu) is free space that can be used, as necessary, to store additional data. As shown in FIG. 3, in some embodiments the storage system may use some of the usable storage capacity (Temp 340) to temporarily increase performance of the storage system.

The amount of free effective space 300 will depend on the amount of free space on managed drives 132 (free space 300' plus space that is temporarily being used by the storage system 340) and the data reduction rate. The data reduction rate, in some embodiments, is calculated as the amount of data stored by host (reducing data 305+unreducible data 330+data reduction disabled 335) divided by the amount of storage space actually used to store that data on managed drives 132 (reduced 305'+unreducible 330+data reduction disabled 335).

Metadata 152 is used to specify, to the storage system 100, various properties of the data that is stored on managed drives 132 of the storage system 100. For example, metadata 152 is used to correlate logical addresses of the host device 142 with physical storage locations of the data on managed drives 132. Metadata is also generated in connection with data reduction. For example, if the pattern detection algorithms are used to detect patterns in the data, metadata is generated correlating tracks of data with the recognized patterns. Similarly, metadata is used in connection with deduplication to identify aspects of the data stored on the storage volume that have been removed prior to storage.

There are many uses of metadata 152, and the use of data reduction techniques, in particular, can generate large volumes of metadata.

In some embodiments, metadata is stored in global memory, such as DRAM, rather than being stored in the usable storage capacity of managed drives 132. While DRAM is fast, often there is a limited amount of DRAM available. Accordingly, the limited amount of memory allocated to storing metadata may limit the effective storage capacity of the storage system.

The amount of effective capacity that a host application can store on a given storage volume therefore is complicated to calculate. As used herein, the term "projected effective capacity" is used to refer to a current estimate of how much effective capacity (TBe) a storage system has at a particular point in time. The projected effective capacity will depend on the data reduction ratio and the availability of metadata resources, as discussed in greater detail below.

Figure 4:
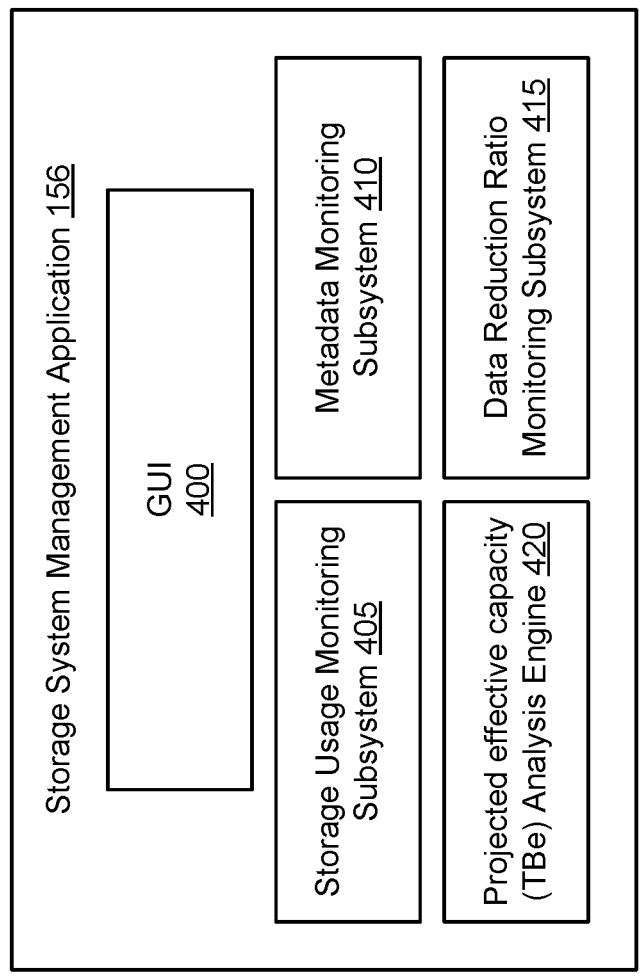
FIG. 4 is a functional block diagram of an example storage system management application, according to some embodiments.

FIG. 4 is a functional block diagram of an example storage system management application 156, according to some embodiments. As shown in FIG. 4, in some embodiments a storage system management application 156 has a graphical user interface 400 that enables a user to interact with the storage system management application 156. The storage system management application 156 is the primary way for a user to configure operation of the storage system 100 and to monitor performance and available storage resources of the storage system 100.

In the embodiment shown in FIG. 4, the storage system management application 156 includes a storage usage monitoring subsystem 405 configured to receive information about the amount of data physically stored on managed drives 132. Storage systems 100 have many ways of detecting resource usage, and the storage usage monitoring subsystem 405 retrieves this information from the storage system 100. For example, in connection with determining the projected effective capacity of the storage system, the storage usage monitoring subsystem 405 would obtain information from the storage system 100 about the amount of data that is currently stored on managed drives 132.

The storage system management application 156 also includes a metadata monitoring subsystem 410, to receive information about the amount of metadata that has been generated in connection with the data that is currently stored on the managed drives 132 of storage system 100. The metadata monitoring subsystem also is provided with information about the total amount of DRAM allocated to storage of metadata 152 for the storage system 100, which in some embodiments may be a user-specified value.

In some embodiments, the storage system management application 156 also includes a data reduction monitoring subsystem 415. The data reduction monitoring subsystem 415 monitors the data reduction ratio by comparing the amount of host data with the amount of data that is actually stored in managed drives 132.

A projected effective capacity analysis engine 420 uses a set of contributing factors, such as the current usage information from the storage usage monitoring subsystem 405, the data reduction ratio from the data reduction monitoring subsystem 415, and the metadata information from the metadata monitoring subsystem 410, to calculate a projected effective capacity of the storage volume. The projected effective capacity, in some embodiments, is visually depicted on GUI 400 in the form of one or more graphs (see FIG. 7) showing changes to the projected effective capacity, usage, and data reduction ratio, over time.

FIG. 5 is a functional block diagram showing a set of contributing factors that influence calculation of projected effective capacity of the managed drives 132 of a storage system 100, according to some embodiments. In some embodiments, the projected effective capacity analysis engine 420 uses the contributing factors shown in FIG. 5 to adjust the projected effective capacity to more accurately estimate how much host data can effectively be stored on the managed drives 132 of storage system 100.

As shown in FIG. 5, the amount of effective capacity is affected by how efficiently the host data may be reduced in size before being stored in managed drives 132 of the storage system 100. Techniques such as compression 500, deduplication 505, and pattern detection 510 are all used to determine a data reduction ratio 515. A higher data reduction ratio 515 will cause the projected effective capacity to increase, whereas a lower data reduction ratio will cause the projected effective capacity to decrease. The amount of free disk space 520 on managed drives 132 will likewise affect the projected effective capacity.

The amount of metadata associated with data stored in managed drives 132 will change depending on the nature of the host data and the types of data reduction applied to the host data. For example, unreducible and DDR disabled data may simply have metadata identifying the location of the data on the managed drives 132 of the storage system 100. Reducible data, however, may consume proportionally more metadata such that as the complexity of data reduction increases, the amount of metadata associated with the storage volume concomitantly increases. Accordingly, a data set with a higher proportion of reducible data 535 may use a larger volume of metadata 545, which may present a limitation on the projected effective capacity 550 if the storage system 100 starts to run out of memory allocated to storing the metadata.

Figure 6:
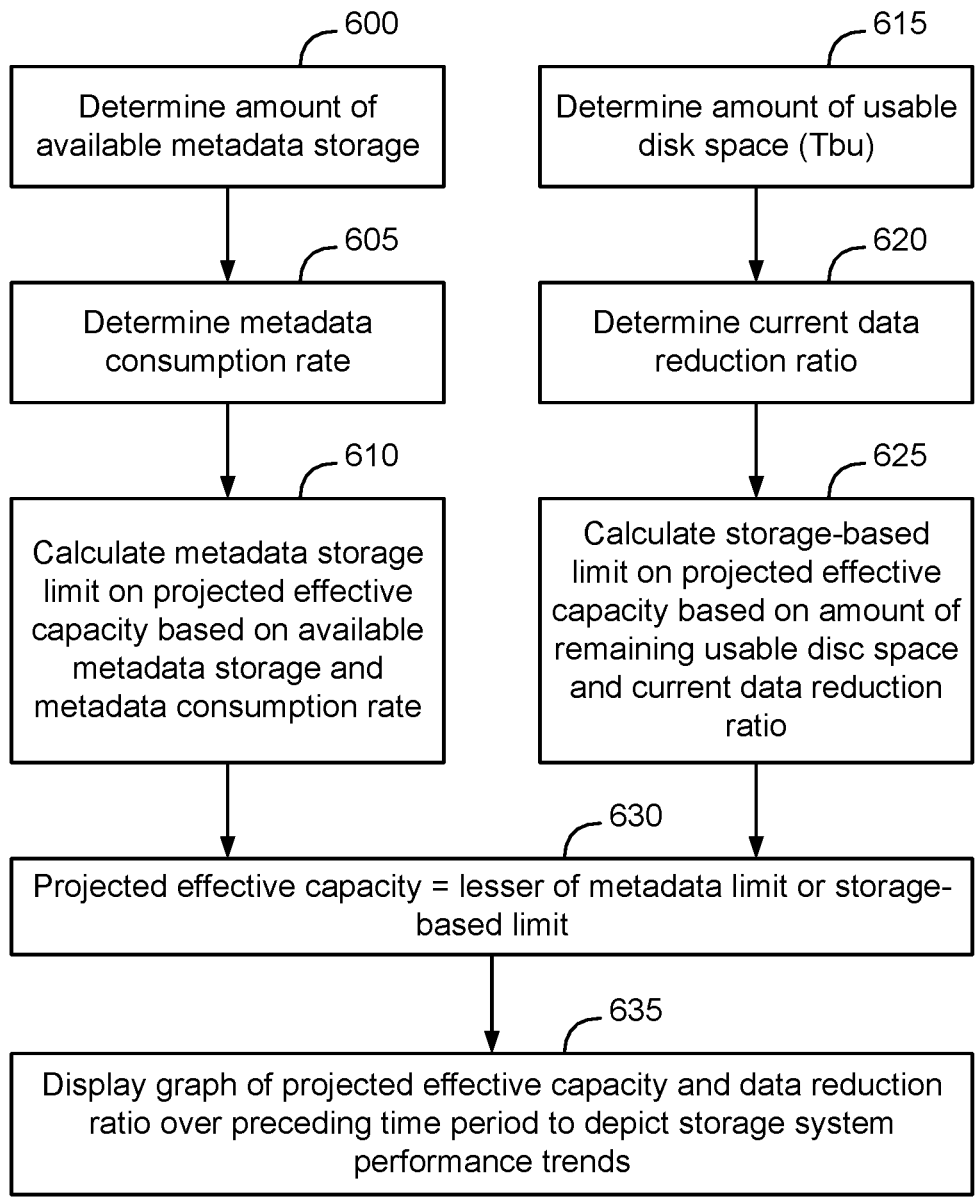
FIG. 6 is a flow chart of an example method of determining and displaying the projected effective capacity of a storage system, according to some embodiments.

FIG. 6 is a flow chart of an example method of determining and displaying the projected effective capacity of a storage system, according to some embodiments.

As shown in FIG. 6, in some embodiments the analysis engine 420 determines the amount of available metadata storage (block 600). The analysis engine 420 also determines the metadata consumption rate (block 605). The metadata consumption rate may be affected by the proportion of the data set that is reducible and the type of reduction operations being used by the storage system to reduce that portion of the data set. Based on these factors, the analysis engine 420 calculates a metadata limit of the projected effective capacity (block 610). The metadata limit, in some embodiments, is based on the amount of allocated and unused metadata storage area for the storage volume times the metadata consumption rate.

For example, assume 250 GB of DRAM has been allocated to store of metadata, and the storage system has 100 TB of usable storage space in managed drives 132. If the drives are currently 80% full (80 TB of data is currently stored on managed drives 132), and the memory allocated to storing metadata is only 40% full (100 GB of metadata has been generated), it would appear that availability of metadata storage would not present a limiting factor on the projected estimated capacity. Specifically, 80% of data consumed 40% of the available metadata storage area, which means that the metadata consumption rate=40%/80%=50%. Thus, it would appear that the storage volume will not run out of metadata storage until the 160 TB of data is stored in managed drives 132. Since the managed drives can only hold 100 TB of data, the availability of metadata storage area in this example will not cause a reduction in projected effective capacity.

By contrast, if the storage volume is currently storing 40 TB of data (40% full), and the amount of metadata that has been generated in connection with storing this 40 TB of data is 200 GB (80% full), it would appear that the availability of metadata storage is likely to present a limiting factor on the projected estimated capacity. Specifically, 40% of data consumed 80% of the available metadata storage area, which means that the metadata consumption rate=80%/40%=200%. At this consumption rate, storing an additional 10 TB of data to the storage volume (50 TB=50%) would be expected to cause the metadata to reach its limit: Metadata limit=% storage volume*Metadata consumption rate=50%*200%=100%. Thus, in this situation the availability of metadata storage will severely constrain the projected effective capacity.

In some embodiments, the metadata-based limit is calculated by looking at the total amount of metadata storage space in DRAM, and dividing that by the current amount of DRAM that is currently being used to store metadata. That provides the metadata use ratio. Multiplying the metadata use ratio by the current amount of data that is currently stored on storage resources 130 provides a projected metadata limit on projected effective capacity.

The projected effective capacity TBe can also be constrained by the current data reduction ratio. Accordingly, in some embodiments the analysis engine determines the amount of usable disk space (block 615). The analysis engine also determines the current data reduction ratio (block 620). The analysis engine then computes a storage-based limit on the projected effective capacity by determining the amount of usable disk space for the storage volume times the current data reduction ratio (block 625).

Both the metadata limit and the storage-based limit are used to determine a projected effective capacity for the storage volume (block 630). Specifically, in some embodiments, the analysis engine determines the projected effective capacity as the lower of the metadata limit (from block 610) or the storage-based limit (from block 625). The projected effective capacity is then displayed, for example, via GUI 400 (block 635).

In some embodiments, as shown in FIG. 7, the projected effective capacity is displayed as a set of graphs showing the projected effective capacity, actual storage usage of managed drives 132, and data reduction ratio, over time. The graph shows these values over a preceding time period to depict the storage system performance trends. For example, the analysis engine may calculate the projected effective capacity every several hours and store those values along with the corresponding data reduction ratio. The graphs of the projected effective capacity and data reduction ratios may then be generated and displayed via GUI to be displayed to the user.

FIG. 7 is a view of an example graphical user interface 400 of a storage system management application 156 containing an example pair of graphs visually depicting the projected effective capacity of a storage system over time, according to some embodiments. As shown in FIG. 7, in some embodiments a pair of related graphs 700, 710 are used to display the interrelationship between actual storage usage 730 of managed drives 132, projected effective capacity 740 of the storage system 100, and the data reduction ratio 750 over time.

For example, as shown in FIG. 7, a first graph 700 may be used to show the variation of projected effective capacity 740 over time as well as the actual storage usage 730 over time. A second graph 710 may be used to show the variation of data reduction ratio 750 over time. Optionally, the two graphs 700, 710 may be combined into a single graph, depending on the implementation.

The two graphs 700, 710 are related, in some embodiments, by causing the two graphs 700, 710 to have the same time scale. A slide bar 720 spanning the pair of graphs 700, 710 may be selected and moved left/right to cause historical reference points to be displayed on the GUI. For example, in FIG. 7 the GUI 400 has been used to move the slide bar to May 10, 2020. On that day, the storage system management application had calculated a projected effective capacity of 705 TB and 580 TB of data were stored on managed drives 132. This resulted in an 82.2% usage ratio with 125 TB of remaining effective capacity. The data reduction ratio on May 10 was 4:1.

By displaying the data reduction ratio 750 relative to the projected effective capacity 740 and actual storage usage 730, it is possible to graphically demonstrate the changes and anomalies in consumption of capacity of the managed drives 132. Specifically, graphing the data reduction ratio over time allows the user to visually see the changes in this major factor and how that contributes to effective capacity fluctuations. For example, in the set of graphs shown in FIG. 7, on February 21 the data reduction ratio was initially around 6:1, and the projected effective capacity was around 1000 TB. As the data reduction ratio dropped from 6:1 to 4:1, the effective capacity also dropped, such that by April 21 the effective capacity had been reduced to around 700 TB.

Over this same time period, the actual storage usage climbed from around 400 TB on February 21 to around 600 TB on May 21. This represents a 50% increase in storage usage. However, on February 21 the usage level was approximately 40% of the projected effective capacity, whereas on May 21 the usage level was approximately 90% of projected effective capacity. By graphically showing this, the storage system management application 156 provides not only the current value of the projected effective capacity, but also shows how the projected effective capacity has been trending recently. This provides greater insight as to how the storage system is operating, and enables a person responsible for monitoring the storage system to anticipate whether a storage system is likely to run out of effective storage capacity. This, in turn, enables the administrator to take corrective action, such as by increasing the data reduction ratio on data stored in the storage system 100 to increase effective storage capacity, or to increase the number or size of managed drives 132 to thereby increase the total usable storage capacity TBu.

By identifying potential capacity limits before they occur, and displaying graphs showing trends of effective storage capacity over time and the data reduction ratio over time, it is possible to increase the reliability of the storage system. Specifically, the storage system management system can determine in advance a potential capacity issue and proactively alert the system administrator of the impending capacity issue by displaying the graphs of the effective storage capacity over time. Once alerted, the system administrator can take corrective action prior to occurrence of the capacity issue. By basing the determination of the possible occurrence of a capacity issue on complex calculations involving multiple contributing factors, the storage system management application can more accurately predict a potential capacity issue before it occurs to thereby prevent occurrence of the capacity issue and increase reliability of the storage system.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of determining and depicting effective storage capacity of a storage system, the computer program including a set of instructions which, when executed by a computer, cause the computer to perform a method comprising the steps of:

writing host data, by hosts, on a set of host devices;
providing the host data, by the host devices, to a storage system for storage on a set of managed drives;
implementing data reduction operations on the host data, by the storage system, to create a reduced volume of data from the host data;
writing the reduced volume of data to the set of managed drives;
generating metadata, by the storage system, associated with the reduced volume of data;
determining a storage-based limit of effective storage capacity of the host devices based on an amount of capacity of the set of managed drives and a data reduction ratio, the data reduction ratio being a ratio between a size of the host data written by the hosts to the host devices and a size of the reduced volume of data written by the storage system to the set of managed drives;

determining a metadata-based limit of effective storage capacity of the host device based on an amount of the metadata generated by the storage system and an amount of memory allocated to storing the metadata on the storage system; and setting an effective storage capacity of the storage system as a lesser of the storage-based limit of effective storage capacity or metadata-based limit of effective storage capacity.

2. The non-transitory tangible computer readable storage medium of claim 1, wherein the data reduction operations include compression, deduplication, and pattern detection.

3. The non-transitory tangible computer readable storage medium of claim 1, wherein the host data includes a first portion of host data that is reducible and a second portion of host data that is unreducible or on which data reduction has been disabled, and wherein the step of implementing data reduction operations on the host data is implemented, by the storage system, only on the first portion of host data.

4. The non-transitory tangible computer readable storage medium of claim 1, wherein the metadata contains information mapping volumes of host data to locations on the sets of managed drives and contains information about data reduction operations implemented on the host data.

5. The non-transitory tangible computer readable storage medium of claim 1, further comprising displaying, via a graphical user interface of a storage system management application, a graph of the output effective storage capacity over time and a graph of the data reduction rate over time.

6. The non-transitory tangible computer readable storage medium of claim 5, further comprising determining an amount of host data provided by the hosts to the storage system, and displaying the amount of host data provided by the hosts to the storage system over time in the graphical user interface.

7. The non-transitory tangible computer readable storage medium of claim 6, wherein the amount of host data provided by the hosts to the storage system is displayed in the graph of the output effective storage capacity over time.

8. The non-transitory tangible computer readable storage medium of claim 5, wherein the graph of the output effective storage capacity over time and the graph of the data reduction rate over time have the same time scale.

9. The non-transitory tangible computer readable storage medium of claim 8, further comprising generating and displaying a slide bar spanning between the graph of the output effective storage capacity over time and the graph of the data reduction rate over time, the slide bar being a movable element in the graphical user interface.

10. A storage system, comprising:
a front-end adapter to receive host data written by hosts on a set of host devices for storage in the storage system;
a data reduction engine to implement data reduction operations on the host data to create a reduced volume of data from the host data;
a set of managed drives to store the reduced volume of data;
a memory configured to store metadata associated with the reduced volume of data; and
a storage system management application having a projected effective capacity analysis engine containing control logic configured to determine and depict an effective storage capacity of the set of managed drives, the control logic being configured to:
determine a storage-based limit of effective storage capacity of the host devices based on an amount of capacity of the set of managed drives and a data reduction ratio, the data reduction ratio being a ratio between a size of the host data written by the hosts to the host devices and a size of the reduced volume of data written by the storage system to the set of managed drives;
determine a metadata-based limit of effective storage capacity of the host device based on an amount of the metadata generated by the storage system and an amount of the memory allocated on the storage system to storing the metadata; and
set an effective storage capacity of the storage system as a lesser of the storage-based limit of effective storage capacity or metadata-based limit of effective storage capacity.

11. The storage system of claim 10, wherein the data reduction operations include compression, deduplication, and pattern detection.

12. The storage system of claim 10, wherein the host data includes a first portion of host data that is reducible and a second portion of host data that is unreducible or on which data reduction has been disabled, and wherein the data reduction engine implements data reduction operations only on the first portion of host data.

13. The storage system of claim 10, wherein the metadata contains information mapping volumes of host data to locations on the sets of managed drives and contains information about data reduction operations implemented on the host data.

14. The storage system of claim 10, wherein the storage system management application further comprises a graphical user interface configured to depict a graph of the output effective storage capacity over time and a graph of the data reduction rate over time.

15. The storage system of claim 14, wherein the storage system management application contains control logic to determine an amount of host data provided by the hosts to the storage system, and the graphical user interface is configured to depict the amount of host data provided by the hosts to the storage system over time.

16. The storage system of claim 15, wherein the graphical user interface is configured to display the amount of host data provided by the hosts to the storage system in the graph of the output effective storage capacity over time.

17. The storage system of claim 14, wherein the graph of the output effective storage capacity over time and the graph of the data reduction rate over time have the same time scale.

18. The storage system of claim 17, wherein the graphical user interface is configured to display a slide bar spanning between the graph of the output effective storage capacity over time and the graph of the data reduction rate over time, the slide bar being a movable element in the graphical user interface.

* * * * *